Dec. 20, 1927.

C. B. ZOLLINGER 1,653,247

SHOVEL OR CRANE

Filed Aug. 14, 1925

INVENTOR.
Charles B. Zollinger.

By

ATTORNEY.

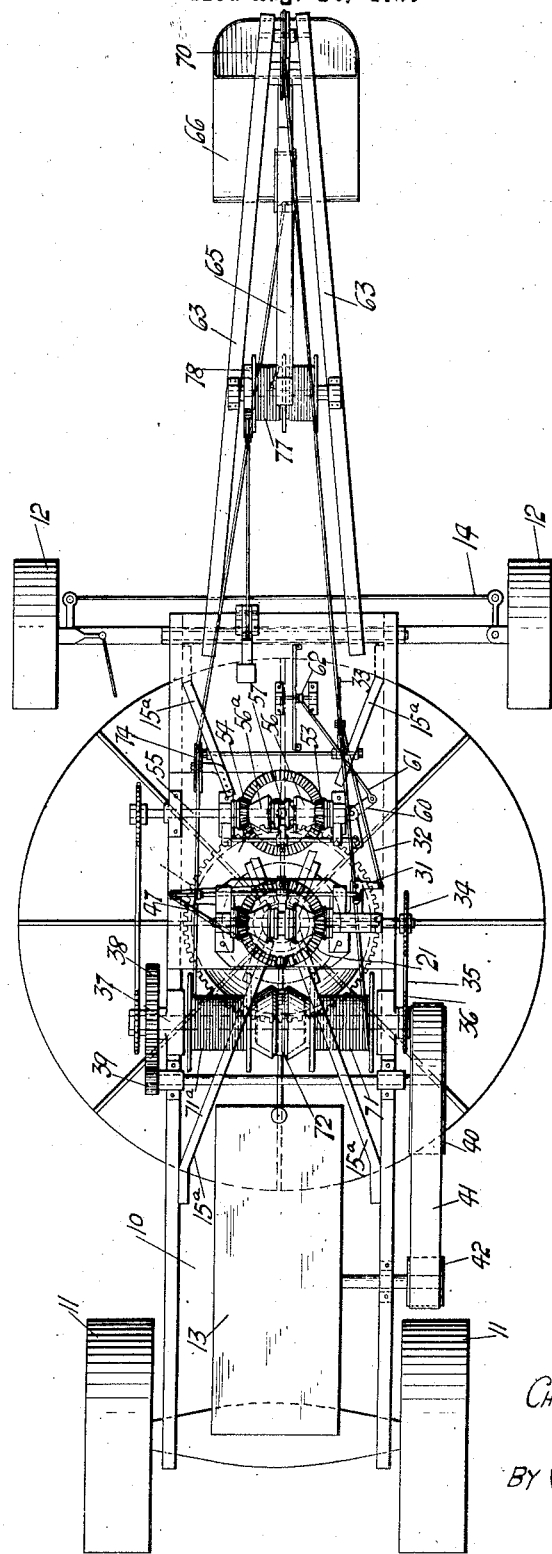

Dec. 20, 1927.

C. B. ZOLLINGER

SHOVEL OR CRANE

Filed Aug. 14, 1925

INVENTOR.
CHARLES B. ZOLLINGER.

BY

ATTORNEY

Patented Dec. 20, 1927.

1,653,247

UNITED STATES PATENT OFFICE.

CHARLES B. ZOLLINGER, OF STERLING, OHIO.

SHOVEL OR CRANE.

Application filed August 14, 1925. Serial No. 50,217.

This invention relates to shovels or cranes and particularly to shovels or cranes mounted on tractors, trucks or other vehicles.

The chief object of the invention is to provide in an apparatus of the class described, a device for elevating the vehicle above the ground to convert it into a full revolving platform for a shovel or crane and also to provide means for rotating the platform driven by the power driving unit of the vehicle.

The foregoing and other objects are obtained by the construction illustrated in the accompanying drawings and described below. It is understood that the invention is not limited to the specific embodiment thereof shown and described.

Of the accompanying drawings:

Figure 2 is a plan thereof;

Figure 1:
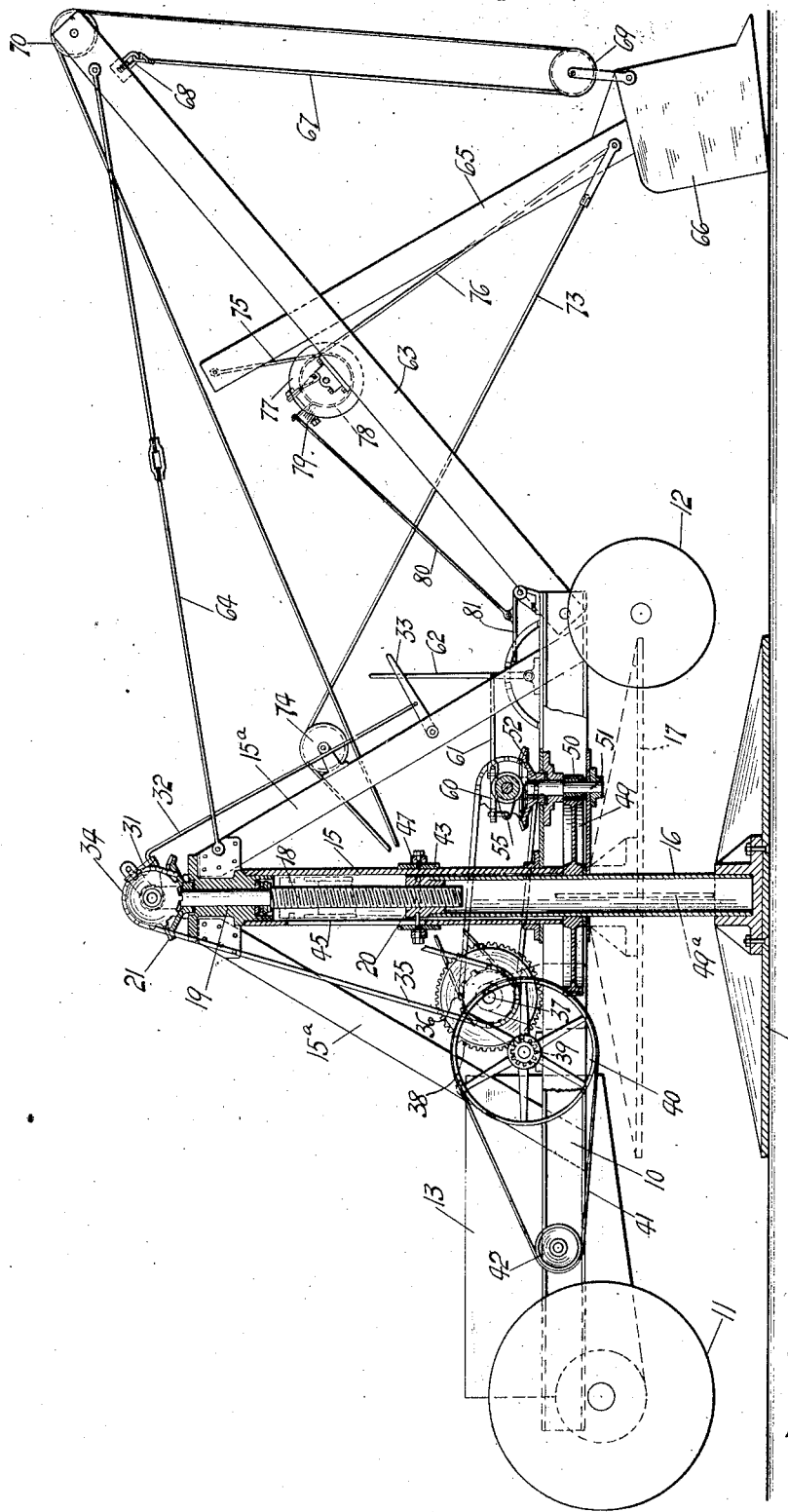
Figure 1 is a side elevation, partly in section, of a tractor driven shovel embodying the invention, the shovel being shown in operative position for excavating.
Figure 4:
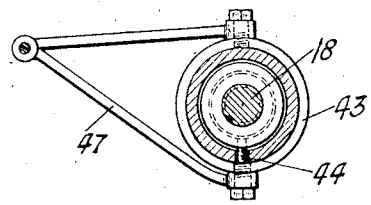
Figure 4 is a section therethrough on line 4—4 of Figure 3.
Figure 3:
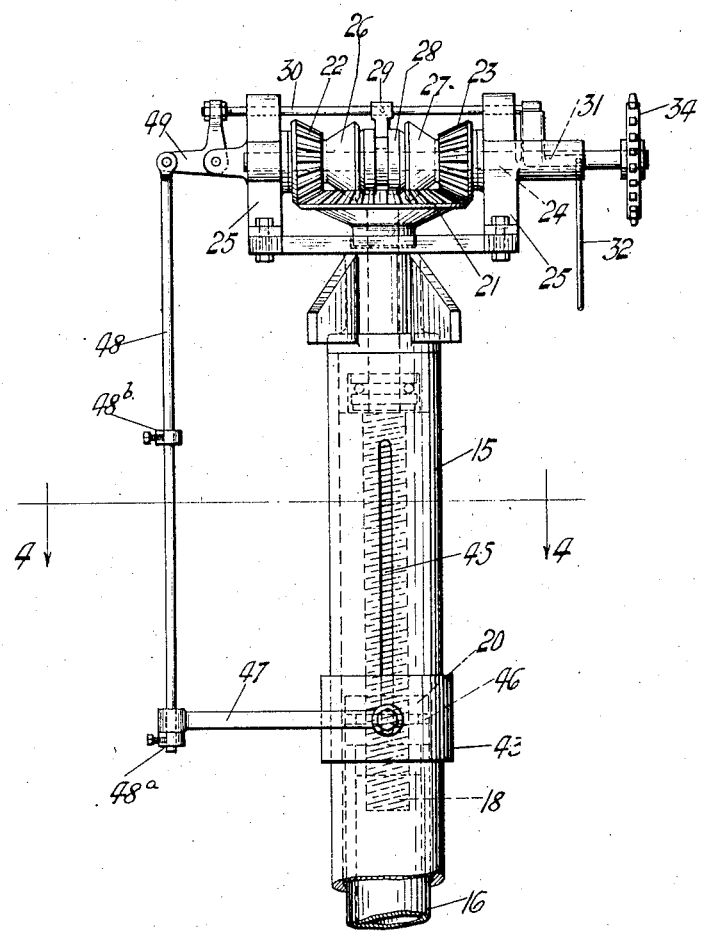
Figure 3 is a detail elevation of the elevator mechanism control means.

Referring to the drawings, 10 represents, generally, the chassis of a suitable vehicle, such as a tractor, mounted on wheels 11, 11 and 12, 12 and driven in the customary manner by a motor 13, a suitable steering mechanism for controlling front wheels 12 being illustrated at 14.

To carry out the present invention, the chassis 10 is provided with a central upstanding cylinder 15 in which is slidably mounted a vertical, hollow, cylindrical stud 16 having on its lower end a base 17 which is adapted to support the entire vehicle 10 off the ground in the manner shown in full lines in Figure 1, but which, during the travel of vehicle 10, may be suspended above the ground beneath chassis 10 as illustrated in dotted lines in Figure 1. Stud 16 also provides a central pin about which vehicle 10 may rotate when in use as a shovel or crane.

The vehicle elevating mechanism includes a screw 18 journaled in a bearing 19 in the top of the central cylinder 15 and extending downwardly therein and threaded through a head 20 secured on the top of stud 16. Suitable braces 15ª, 15ª may be employed for strengthening the cylinder 15 so that it will support the mechanism just described.

For operating screw 18 to raise or lower vehicle 10, the screw has secured on the top thereof a bevel gear 21 meshing with bevel gears 22 and 23 rotatable on a cross-shaft 24 journaled in bearing brackets 25, 25 supported on the top of cylinder 15, gear 22 or 23 being adapted to be clutched onto shaft 24 by means of a cone clutch 26 or 27 shiftable by means of a collar 28 keyed or splined onto shaft 24 and operable by a yoke 29 secured on a rod 30 slidable on brackets 25 and adapted to be hand-operated by a bell crank lever 31 to which is connected a rod 32 in turn connected to a hand lever 33.

Shaft 24 may be driven by a sprocket 34 over which is trained a chain 35 driven by a sprocket 36 on a hoist operating shaft 37 which may be driven by a gear 38 thereon meshed with a pinion 39 driven by a pulley 40. Pulley 40 may be driven by a belt 41 trained over a pulley 42 driven in any suitable manner by motor 13.

In order that the elevation or lowering of the stud 16 may automatically be limited so as to prevent destruction of the device by improper manipulation of lever 33, there is arranged so as to slide on cylinder 15, a sleeve 43 having a pin 44 thereon projecting through a vertical slot 45 in cylinder 15 and engaging in a circumferential groove 46 in head 20 whereby sleeve 43 will slide on cylinder 15 with said head but will be permitted to rotate relatively thereto during revolving of the shovel. Sleeve 43 has connected thereto an arm 47 through the end of which is arranged to slide a rod 48 connected by a bell crank lever 49 to rod 30 so as to reciprocate the latter as will be explained. On rod 48 are collars 48ª and 48ᵇ, the former being positioned so as to be engaged by arm 47 to automatically throw out clutch 27 when the desired elevation of the chassis 10 has been reached, and the latter being so positioned as to be engaged by arm 47 to throw out clutch 26 when base 17 has been drawn upwardly sufficiently under chassis 10.

The revolution of the vehicle 10 on stud 16 is effected by means of a ring gear 49 rotatably mounted on the under side of chassis 10 and keyed or splined onto stud 15, as indicated at 49ª, so as to be slidable thereon. Meshed with ring gear 49 is a pinion 50 secured on a shaft 51 journaled on chassis 10 and having a bevel gear 52 fixed thereon and meshed with bevel gears 53 and 54 journaled on a shaft 55. Shaft 55 is journaled on chassis 10 and has keyed or splined thereon shiftable clutches 56 and 56ᵃ operable by collar 57 for clutching either gear 53 or 54 to the shaft to drive pinion 50 in either direction. Collar 57 is operable by means of a yoke 58 on a reciprocable rod 59 operable by hand by means of a bell crank lever 60, to which is connected a rod 61 in turn connected to a lever 62.

The construction described above illustrates the manner in which the vehicle 10 may be elevated above the ground and revolved into any position while so elevated. The vehicle may carry a hoisting device such as a crane or a shovel as shown. The following description will briefly set forth the provision of a shovel on said vehicle.

On the forward end of chassis 10 is supported a boom 63 supported in an upwardly inclined position by the rods 64, 64 and having slidably mounted thereon in any suitable manner a dipper stick 65 carrying a scoop 66.

Operation of stick 65 can be effected by a cable 67 connected at 68 to the end of boom 63 and extending about a bale 69 attached to scoop 66 and over a sheave 70 on the end of boom 63 to a hoisting drum 71 journaled on shaft 37 and arranged to be clutched thereto by being shifted by means (not shown) into engagement with a cone 72 fixed on shaft 37. A cable 73 is also connected to dipper stick 65 for control thereof and is passed over a sheave 74 on one brace 15ᵃ to a drum 71ᵃ in all respects similar to drum 71 and operable by suitable means (not shown).

Movement of stick 65 by cables 67 and 73 may be controlled in any suitable way, as by cables 75 and 76 connected to opposite ends of stick 65 and reversely wound upon a drum 77 journaled on boom 63 and about which is a brake band 78 normally preventing rotation of drum 77 by action of a spring 79, but adapted to be released by a cable 80 connected thereto and to an operating lever 81 on chassis 10.

The operation of the device will be understood from the foregoing description. Briefly, it consists in transporting the shovel or crane from place to place by driving vehicle 10 in the usual manner. When at the operating location, clutch 27 will be engaged and screw 18 driven first to lower base 17 onto the ground and then to elevate chassis 10 on stud 16 to the position shown in Figure 1, the clutch being automatically disengaged, as will be understood.

The shovel or crane may now be operated in the customary manner, revolving of the chassis to and fro or completely around to any angular position on stud 16 being effected by proper manipulation of clutches 56 and 56ᵃ.

It will appear from the foregoing that the present inventor has devised a vehicle, i. e., tractor, truck or the like having a shovel or crane thereon and adapted to be elevated off the ground and converted into a full revolution platform for the shovel or crane.

Modifications of the invention may be resorted to without departing from the spirit thereof or the scope of the appended claims.

What is claimed is:

1. Apparatus of the class described, comprising a vehicle, a central vertical hollow cylinder extending upwardly from the chassis of the vehicle, a hollow cylindrical stud slidable in said cylinder, and extending beneath the chassis, a base on the lower end of said stud, a screw journaled on said cylinder so as to project downwardly therein, said screw being threaded into said stud, means for rotating said screw in either direction to raise or lower the stud relative to the chassis, automatic means for stopping the screw at both limits of movement of the stud relative to said chassis, a vehicle revolving member rotatably mounted on the under side of the chassis and keyed onto said stud so as to be slidable thereon, a driving member journaled on the chassis and having driving connection with the vehicle revolving member, and means for driving the driving member in either direction.

2. Apparatus of the class described, comprising a vehicle, a central vertical hollow cylinder extending upwardly from the chassis of the vehicle, a hollow cylindrical stud slidable in said cylinder, and extending beneath the chassis, a base on the lower end of said stud, a screw journaled on said cylinder so as to project downwardly therein, said screw being threaded into said stud, means for rotating said screw in either direction to raise or lower the stud relative to the chassis, a vehicle revolving member rotatably mounted on the under side of the chassis and keyed onto said stud so as to be slidable thereon, a driving member journaled on the chassis and having driving connection with the vehicle revolving member, and means for driving the driving member in either direction.

3. Apparatus of the class described, comprising a vehicle, a central vertical hollow cylinder extending upwardly from the chassis of the vehicle, a hollow cylindrical stud slidable in said cylinder, and extending beneath the chassis, a base on the lower end of said stud, a screw journaled on said cylinder so as to project downwardly therein, said screw being threaded into said stud, means for rotating said screw in either direction to raise or lower the stud relative to the chassis, and means for revolving the chassis on said stud.

4. Apparatus of the class described comprising a vehicle having a power unit on one end and a hoisting device on the other end, means operable by the power unit to operate the hoisting device, a vertical stud on the vehicle intermediate the power unit and the hoisting device, the stud and vehicle being relatively movable vertically, a base on the stud adapted to be suspended beneath the vehicle when traveling, means operable by the power unit to relatively move the stud and vehicle to elevate the vehicle from or lower it to the ground, means operable by the power unit for revolving the vehicle about the stud when elevated thereon, and control means for said last named means and for said hoisting device, operating means whereby both are simultaneously operable from the power means.

CHARLES B. ZOLLINGER.